United States Patent
Xu et al.

(10) Patent No.: US 6,240,201 B1
(45) Date of Patent: *May 29, 2001

(54) COMPUTERIZED DETECTION OF LUNG NODULES USING ENERGY-SUBTRACTED SOFT-TISSUE AND STANDARD CHEST IMAGES

(75) Inventors: Xin-Wei Xu, Darien; Kunio Doi, Willowbrook; Heber MacMahon, Chicago, all of IL (US)

(73) Assignee: Arch Development Corporation, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,719

(22) Filed: Jul. 24, 1998

(51) Int. Cl.[7] .................................................. G06K 9/00
(52) U.S. Cl. ............................ 382/130; 382/131; 382/128
(58) Field of Search .................................. 382/130, 132, 382/154, 128, 131; 378/8, 37; 128/925; 324/308; 600/364, 501, 526

(56) References Cited

U.S. PATENT DOCUMENTS

| | | | |
|---|---|---|---|
| 5,072,384 | 12/1991 | Doi et al. | 364/413 |
| 5,273,040 | 12/1993 | Apicella et al. | 128/653 |
| 5,359,513 | 10/1994 | Kano et al. | 364/413 |
| 5,535,289 | 7/1996 | Ito | 382/130 |
| 5,598,481 * | 1/1997 | Nishikawa et al. | 382/130 |
| 5,633,951 * | 5/1997 | Moshfeghi | 382/154 |
| 5,638,823 | 6/1997 | Akay et al. | 128/691 |
| 5,644,232 | 7/1997 | Smith | 324/309 |
| 5,647,360 | 7/1997 | Bani-hashemi et al. | 128/653 |
| 5,657,362 | 8/1997 | Giger et al. | 378/37 |
| 5,734,739 | 3/1998 | Sheehan et al. | 382/128 |
| 5,850,465 * | 12/1999 | Shimura et al. | 382/132 |
| 5,881,124 * | 3/1999 | Giger et al. | 378/8 |

* cited by examiner

Primary Examiner—Matthew C. Bella
Assistant Examiner—M. B. Choobin
(74) Attorney, Agent, or Firm—Oblon, Spivak, McClelland, Maier & Neustadt, P.C.

(57) ABSTRACT

A method, system and computer readable medium configured for computerized detection of lung abnormalities, including obtaining a standard digital chest image and a soft-tissue digital chest image; generating a first difference image from the standard digital chest image and a second difference image from the soft-tissue digital chest image; identifying candidate abnormalities in the first and second difference images; extracting from the standard digital chest image and the first difference image predetermined first features of each of the candidate abnormalities identified in the first difference image; extracting from the soft-tissue digital chest image and the second difference images predetermined second features of each of the candidate abnormalities identified in the second difference image; analyzing the extracted first features and the extracted second features to identify and eliminate false positive candidate abnormalities respectively corresponding thereto; applying extracted features from remaining candidate abnormalities derived respectively from the first and second difference images and remaining after the elimination of the false positive candidate abnormalities to respective artificial neural networks to eliminate further false positive candidate abnormalities; performing a logical OR operation of the candidate abnormalities derived respectively from the first and second difference images and remaining after the elimination of the false positive candidate abnormalities; and outputting a signal indicative of a result of performing the logical OR operation. The logical OR combination, of locations of the candidate abnormalities detected in the first difference image and the second difference image, yields an improved detection sensitivity (over 90%) and only slightly increased false positives rate (3.2 false positives per chest image).

21 Claims, 5 Drawing Sheets

COMPUTERIZED DETECTION OF LUNG NODULES USING ENERGY-SUBTRACTED SOFT-TISSUE AND STANDARD CHEST IMAGES

CROSS-REFERENCE TO RELATED APPLICATIONS AND PUBLICATIONS

The present invention is related to automated techniques for automated detection of abnormalities in digital images, for example as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; and 5,740,268; as well as U.S. application Ser. Nos. 08/158,388; 08/173,935; 08/220,917; 08/398,307; 08/428,867; 08/523,210; 08/536,149; 08/515,798; 08/562,188; 08/562,087; 08/757,611; 08/758,438; 08/900,188; 08/900,189; 08/900,191; 08/900,192; 08/900,361; 08/900,362; 08/979,623; 081979,639; 08/982,282; 09/028,518; 09/027,685, and 09/053,798, each of which are incorporated herein by reference in their entirety. Of these patents and applications, U.S. Pat. Nos. 4,907,156; 5,289,374; 5,319,549; 5,463,548; 5,622,171; U.S. Ser. Nos. 08/562,087; 08/562,188; 08/757,611; 08/758,438; 08/900,361 and 09/027,685 are of particular interest.

The present invention also relates to various technologies referenced and described in the references identified in the appended APPENDIX and cross-referenced throughout the specification by reference to the number, in brackets, of the respective reference listed in the APPENDIX, the entire contents of which are also incorporated herein by reference. Various of these publications may correspond to various of the cross-referenced patents and patent applications.

BACKGROUND OF THE INVENTION

1. Field of the Invention

The present invention is related to computer-aided detection of lung nodules in medical images and, in particular, to computer-aided diagnosis of soft-tissue and standard chest radiograph images for improving performance in detecting lung nodules.

2. Discussion of the Background

Lung cancer is the leading cause of cancer deaths among the population in the United States. It is estimated that there were 177,000 new lung cancer cases and 158,700 patient deaths from this disease in 1996. Patients with early detection of lung cancer followed by proper treatment with surgery and/or combined with radiation and chemotherapy can improve their five-year survival rate from 13% to about 41%. [1] Currently, chest radiography is still the most commonly used diagnostic modality for detecting the solitary lung nodule in chest images, which is an important sign of primary lung cancer. However, the detection and diagnosis of pulmonary nodules in standard chest radiographic images are very difficult even for experienced radiologists, mainly because of the interference of the normal anatomic background structures in the images. Standard chest radiographic images are chest images containing normal anatomic background structures in the images, such as ribs, clavicle, cardiac shadow, and pulmonary vessels, and typically obtained by single-exposure using screen film systems. Many studies have indicated that radiologists could overlook up to 30% of actual lung cancer cases. [2–4] Previously, investigators at the Department of Radiology of the University of Chicago have developed an improved computer-aided diagnosis (CAD) scheme for automated detection of lung nodules in standard chest radiographic images. [5–6] Radiologists may use the computer output from the CAD scheme as a "second opinion" to improve their diagnostic accuracy in the detection of early lung cancer.

Nevertheless, the normal anatomic background structures in the standard chest radiographic image, namely, ribs, clavicle, cardiac shadow, and pulmonary vessels tend to degrade the performance (in terms of the sensitivity and number of false positives per image) of the CAD scheme. Nodules may not be detected by the CAD scheme if they overlap fully or partially with ribs or clavicles. Crossings of rib-rib or rib-vessel are the major source of a false-positive detection output from the CAD scheme. Therefore, it is expected that the performance of lung nodule detection from the CAD scheme for the chest radiographic images would be improved if the bony structures can be removed therefrom.

The energy subtraction technique implemented in some recent chest computed radiography (CR) systems have provided soft-tissue chest images in which bony structures are successfully removed by subtraction of a properly weighted low energy x-ray exposed image from a properly weighted high energy x-ray exposed image. [7–11] However, soft-tissue images usually are very noisy and lower in image contrast compared with standard chest radiographic images.

STATEMENT REGARDING FEDERALLY SPONSORED RESEARCH

The present invention was made in part with U.S. Government support under grant numbers CA 62625 (National Institutes of Health). The U.S. Government has certain rights in the invention.

SUMMARY OF THE INVENTION

It is an object of the present invention to provide improved automated lung nodule detection using soft-tissue and standard chest images.

It is another object of the present invention to provide an improved CAD scheme for lung nodule detection using both soft-tissue and standard chest images.

It is a further object of the present invention to provide an improved CAD scheme for lung nodule detection using soft-tissue and standard chest images, as well as the logical OR combination of the two.

These and other objects are achieved according to the present invention by providing a novel method, system and computer readable medium for computerized detection of lung abnormalities, including obtaining a standard digital chest image and a soft-tissue digital chest image; generating a first difference image from the standard digital chest image and a second difference image from the soft-tissue digital chest image; identifying candidate abnormalities in the first and second difference images; extracting from the standard digital chest image and the first difference image predetermined first features of each of the candidate abnormalities identified in the first difference image; extracting from the soft-tissue digital chest image and the second difference images predetermined second features of each of the candidate abnormalities identified in the second difference image; analyzing the extracted first features and the extracted second features to identify and eliminate false positive candidate abnormalities respectively corresponding thereto; performing a logical OR operation of the candidate abnormalities derived respectively from the first and second difference images and remaining after the elimination of the false positive candidate abnormalities; and outputting a signal indicative of a result of performing the logical OR operation.

The present invention similarly includes a computer readable medium storing program instructions by which the method of the invention can be performed when the stored program instructions are appropriately loaded into a computer, and a system for implementing the method of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figures 1, 2, 3:
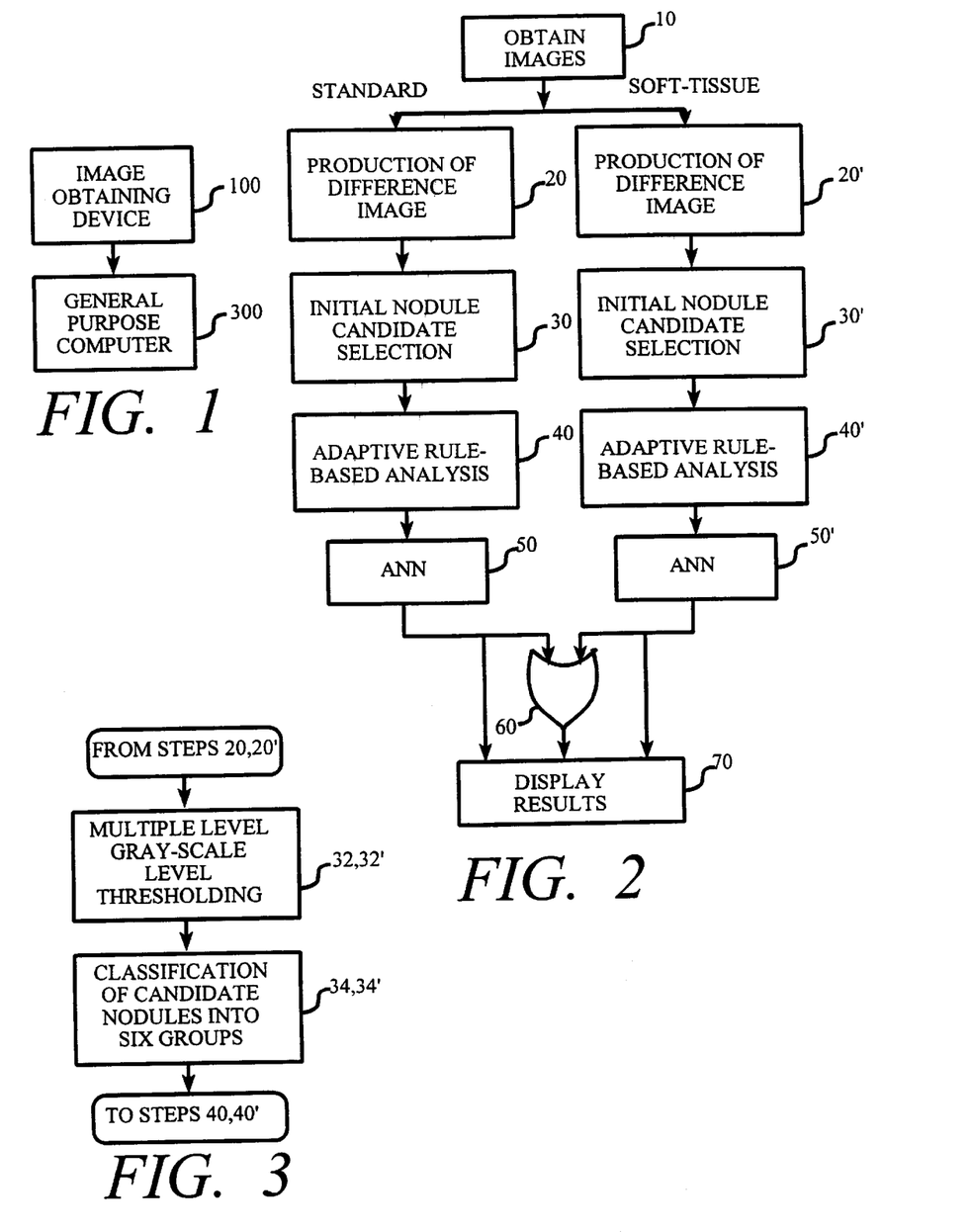
FIG. 1 is a top-level block diagram of the system for implementing the computer-aided diagnosis (CAD) scheme according to the present invention.
FIG. 2 is a flowchart illustrating the CAD scheme according to the present invention.
FIG. 3 is a flowchart illustrating details of the CAD scheme according to the present invention.

Referring now to the drawings, wherein like reference numerals designate identical or corresponding parts throughout the several views, and more particularly to FIG. 1 thereof, there is illustrated a top-level block diagram of the system for implementing the computer-aided diagnosis (CAD) scheme according to the present invention According to the present invention, a total of 31 pairs or cases of, e.g., 10"×12", standard and soft-tissue chest films were used. These films were printed from April to September, 1997, in The Department of Radiology, The University of Chicago Hospitals. All of these cases contained lung nodules. A total of 65 nodules were confirmed in these 31 cases by two chest radiologists, based on their consensus.

In FIG. 1, the system includes digital image obtaining device(s) 100 coupled to a computer 300. Digital images are obtained via digital image obtaining device(s) 100, such a as an X-ray printing device and an image acquisition device. For example, films are printed using the X-ray printing device, such the CR system, or the like. Digital images of the 31 pairs of standard and soft-tissue chest films are obtained by digitization of these films using the image acquisition device, such as the Konica laser digitizer (LD4500), or the like. The resolution and the gray scale of the digitization is, for example, 0.175 mm and 10 bits, respectively. The digital images are then, for example, sub-sampled to a matrix size of 500×500 with an effective pixel size of 0.7 mm (not shown).

In addition, it should be noted that digital images can also be obtained with the digital image obtaining device(s) 100, such as a picture archive communication system (PACS). In other words, often the digital images being processed will be in existence in digital form and need not be converted to digital form in practicing the invention.

The CAD scheme according to the present invention, based on the obtained digital images, is implemented using a general purpose computer 300, such as a Intel-based personal computer, Macintosh personal computer, or the like, as is later described, coupled to the digital image obtaining device(s) 100 via a network connection, modem connection, or the like.

FIG. 2 is a top-level flowchart illustrating the (CAD) scheme according to the present invention. In FIG. 2, after obtaining a digital image at step 10, the CAD scheme according to the present invention includes four major processing steps 20–50 for standard images and 20'–50' for soft-tissue images. [5–6] As previously discussed, the digital images may be obtained, for example, via digital image obtaining device(s) 100, such as (i) the X-ray printing device and the image acquisition device, or (ii) the PACS.

In steps 20 and 20', a difference image for each of the standard and soft-tissue chest images is produced (e.g., as taught in U.S. Pat. No. 4,907,156 and patent application Ser. Nos. 08/562,087 and 09/027,685) based on the respective images acquired at step 10. Next, initial nodule candidates are selected from the respective difference images at steps 30 and 30' (e.g., as taught in U.S. patent application Ser. No. 08/900,361), as is later described.

In steps 40 and 40', adaptive rule-based analysis is performed on the standard digital chest image and its difference image (step 40) and separately on the soft-tissue digital chest image and its difference image (step 40'). In step 40, features are extracted from the standard digital chest image and from its respective difference image and the extracted features are analyzed to identify false positive nodule candidates and to eliminate the identified false positives nodule candidates from further consideration. Correspondingly, in step 40', features are extracted from the soft-tissue digital chest image and its respective difference image and the extracted features are analyzed to identify false positive nodules candidate and to eliminate the identified false positives nodule candidates from further consideration (e.g., as taught in U.S. Pat. Nos. 5,289,374 and 5,319,549 and patent application Ser. Nos. 08/562,087 and 08/900,361). [5–6] The extracted features are related to gray level, morphology, or edge gradient, such as effective diameter, degrees of circularity and irregularity, slopes of the effective diameter and degrees of circularity and irregularity, average gradient, standard deviation of gradient orientation, contrast and net contrast (e.g., as taught in patent application Ser. No. 08/562,087).

In steps 50 and 50', trained artificial neural network (ANN) are employed for further removal of false positive outputs remaining after the adaptive rule-based analysis of steps 40 and 40' (e.g., as taught in U.S. Pat. Nos. 5,463,548 and 5,622,171 and patent application Ser. Nos. 08/562,087; 08/562,188; 08/758,438; 08/900,361; and 09/027,685), respectively. A logical OR operation is performed on the results from steps 50 and 50' at step 60 and a signal indicative of a result of performing the logical OR operation is output.

At step 70, the results of the CAD scheme are displayed with arrows, or the like (e.g., as taught in patent application Ser. Nos. 08/757,611, and 08/900,361), indicating the location of the final nodule candidates determined from steps 50, 50' and/or step 60, on the soft-tissue or standard images.

FIG. 3 is a flowchart illustrating initial nodule candidate selection of steps 30 and 30' in FIG. 2. In FIG. 3, multiple gray-level thresholding of the respective difference images obtained at steps 20 and 20' is performed at steps 32 and 32' followed by classification of each of the respective candidates into six groups at steps 34 and 34' (e.g., as taught in patent application Ser. Nos. 08/562,087 and 08/900,361). Briefly, after the initial nodule candidates are selected from the difference image by multiple gray-level thresholding, these nodule candidates are then classified in six groups according to their "starting % threshold levels", i.e., the percentage threshold levels at which the nodule candidates can be identified (see, e.g., patent application Ser. No. 08/562,087). [5–6]

It is noted that the CAD scheme was initially developed for standard chest images. According to the present invention, it was found that this scheme can be applied to soft-tissue chest images directly without any modification of the basic procedures of the CAD scheme. However, the rules for applying the adaptive rule-based tests to eliminate false positives in each candidate group typically were determined separately for standard and soft-tissue chest images (e.g., steps 40 and 40' of FIG. 2).

Individual selection of adaptive rule-based test rules for standard and soft-tissue chest images is typically necessary, because the derived image features are typically different for nodule candidates in standard and in soft-tissue chest images. For example, the effective diameter (in terms of mm) and degree of circularity obtained by a region growing technique on a nodule in soft-tissue images tends to be larger than that of the same nodule in standard chest images. This is because, in the soft-tissue images, the effects of ribs or bones on the region growing process are diminished, and thus the size and shape derived from the region growing process for a nodule are very close to its actual size and shape. However, for the same nodule in the standard chest images, the size and shape obtained by the region growing technique typically tend to be smaller and more irregular than the original size and shape due to the presence of rib or bone structures around the nodule.

Because the soft-tissue chest images typically appear low in image contrast and noisy, the image feature of nodule contrast, which is defined as the pixel value difference before and after the region growing process, derived from the soft-tissue images typically is smaller than that from the corresponding standard chest images. However, although the rules for applying the adaptive rule-based tests to eliminate false positives in each candidate group typically were determined separately for standard and soft-tissue chest images, the same adaptive rule-based tests could be applied to both types of images. In addition, although the flowchart of FIG. 2 shows respective parallel paths for processing the standard and soft-tissue images (e.g., FIG. 2, steps 20–50 and 20'–50'), it is possible to perform serial processing of both types of images (e.g., FIG. 2, steps 20–30 and 50), especially where the same adaptive rule-based analysis is performed for each type of image (e.g., if in FIG. 2, steps 40 and 40' are the same).

For both the standard and soft-tissue images, the present invention employs an artificial neural network (ANN) for further analysis and further elimination of false positives, where possible (FIG. 2, steps 50 and 50'). Thereafter, in a preferred embodiment of the invention, the remaining candidate nodules are OR'd (FIG. 2, step 60)and signals related thereto are output, for example, for display. (FIG. 2, step 70). In step 50, for each candidate nodule derived from the standard chest image and remaining after step 40, extracted features for the respective remaining candidate nodule are applied as ANN inputs to an ANN. In steps 50, for each remaining candidate nodule, respective extracted features at steps 40 from both the standard chest image and its difference image are applied as ANN inputs. Similar processing occurs in step 50' on the remaining candidate nodules derived from the soft-tissue image and its difference image. In the constructing the ANN, the present invention employs, for example, the leave-one-out method instead of the Jack-Knife method because of the relatively small database. The final performance of the CAD scheme for the standard and soft-tissue chest images is represented by FROC curves, as is later discussed.

Figure 4A:
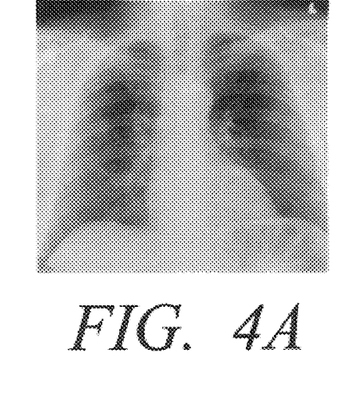
FIGS. 4A and 4B show a standard chest image (FIG. 4A) and its corresponding soft-tissue chest image (FIG. 4B), wherein nodules at right middle lung and left lower lung are overlapped with ribs.
Figure 4B:
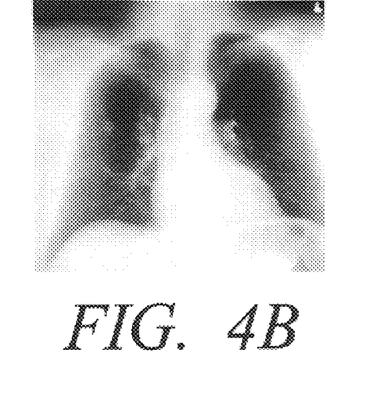
Figure 5A:
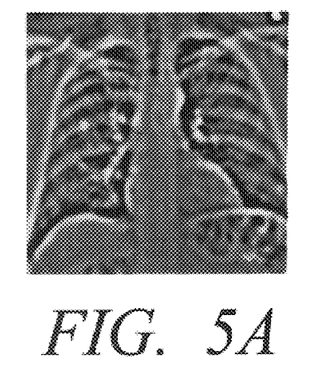
FIGS. 5A and 5B show difference images of the standard (FIG. 5A) and soft-tissue (FIG. 5B) chest images, wherein the difference image of the soft-tissue image has a more uniform background than that of the standard chest image.
Figure 5B:
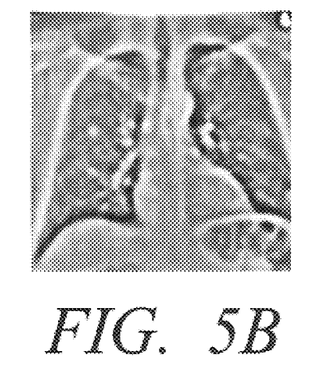

FIGS. 4A and 4B respectively show standard and soft-tissue chest images showing two nodules in the middle right and lower left lung. The difference images corresponding to the standard and soft-tissue chest images are shown in FIGS. 5A and 5B, respectively. It is noted that the difference image resulting from the soft-tissue image contains a more uniform background than does that from the corresponding standard image. Thus, it is expected that the difference image resulting from the soft-tissue image would yield fewer false positives. It also noted that some nodules in the standard chest images are overlapped with ribs, for example, the lower left lung nodule in FIG. 4A. These nodules are often less enhanced, even by the difference image technique, and thus are difficult to detect in the standard chest images. However, these nodules may be detectable in the soft-tissue images because of the removal of the rib or bone structures as shown in FIG. 4B.

Figure 6A:
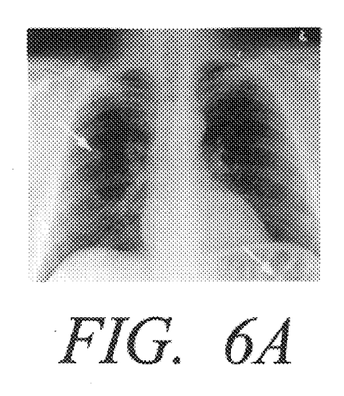
FIGS. 6A and 6B show computer outputs from the CAD scheme according to the present invention for the standard (FIG. 6A) and the soft-tissue (FIG. 6B) chest images, wherein two nodules are detected by the CAD scheme in the soft-tissue chest image without any false positives and the left lower nodule is missed by the CAD scheme in the standard chest image.
Figure 6B:
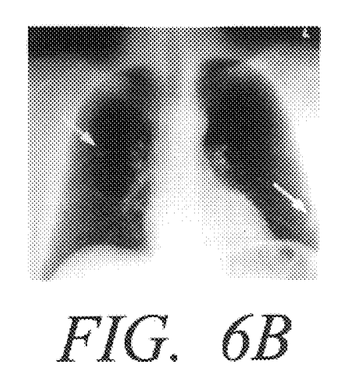

FIGS. 6A and 6B show the respective computer display outputs from the CAD scheme according to the present invention for the standard and the soft-tissue images. It is noted that the lower left lung nodule was not detected in the standard chest image (FIG. 6A). Nevertheless, in the corresponding soft-tissue chest image (FIG. 6B), the CAD scheme detected both the middle right and lower left lung nodules with no false positive output. For a pair of standard and soft-tissue chest images, the logical OR combination output is also displayed on the computer (i.e., with arrows as taught in U.S. patent application Ser. Nos. 08/757,611, and 08/900,361) marked on the standard chest images to indicate the potential nodule locations. However, these arrows are derived from the logical OR operation of detected nodule locations of the standard and its corresponding soft-tissue chest image. In this case, the logical OR combination output (not shown) is the standard chest image or the soft-tissue chest image with a total of 3 arrows pointing to the middle right nodule, lower left nodule, and a false positive at the left diaphragm area, respectively.

Figure 7A:
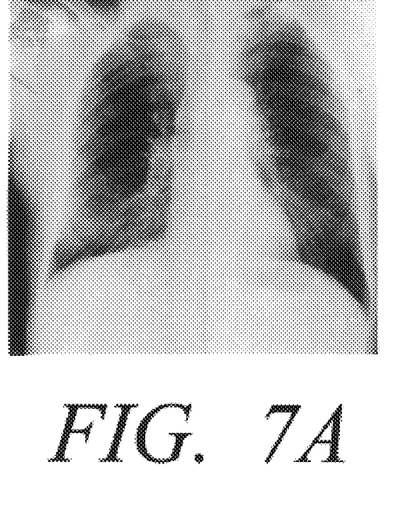
FIGS. 7A and 7B show the standard (FIG. 7A) and its corresponding soft-tissue (FIG. 7B) chest image, wherein a nodule is located at an apex of left lung.
Figure 7B:
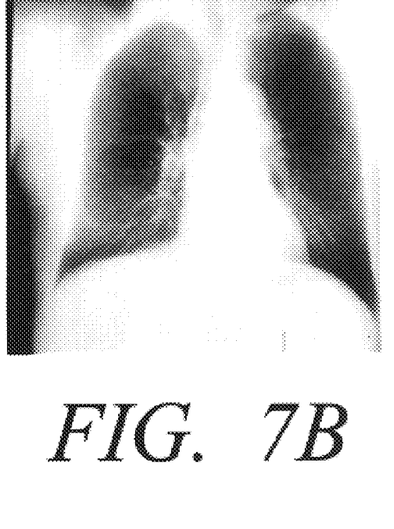
Figure 8A:
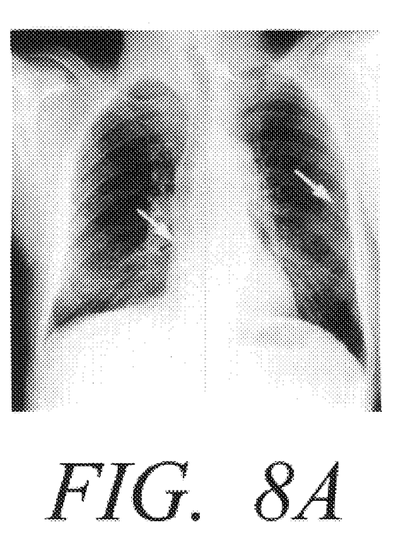
FIGS. 8A and 8B show the computer outputs from the CAD scheme according to the present invention for the standard (FIG. 8A) and soft-tissue (FIG. 8B) chest images, wherein the nodule at the apex of left lung is not detected by the CAD scheme for the soft-tissue image due low image contrast and high noise level in that region and the nodule is detected in the standard chest image with two false positives.
Figure 8B:
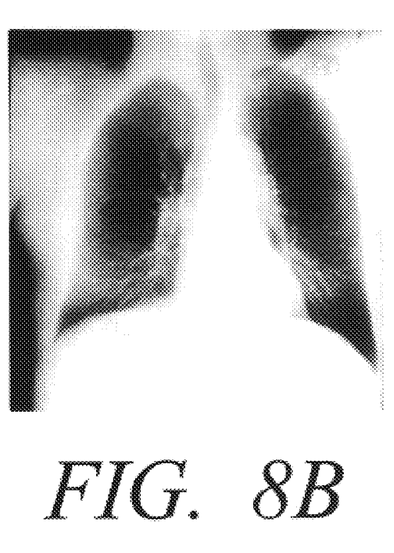

In FIGS. 7A and 7B, a nodule is present at the apex of the left lung. The soft-tissue chest image (FIG. 7B) has a low image contrast and high noise level around the nodule area. Accordingly, the CAD scheme according to the present invention does not detect this nodule in the soft-tissue chest image (FIG. 7B) due to these factors as shown in FIG. 8B. However, this nodule is detected in the standard chest image (FIG. 7A), but with two false positives as shown in FIG. 8A. In this case, the logical OR combination output (not shown) is the same as the output on the standard chest image (FIG. 8A).

Figure 9:
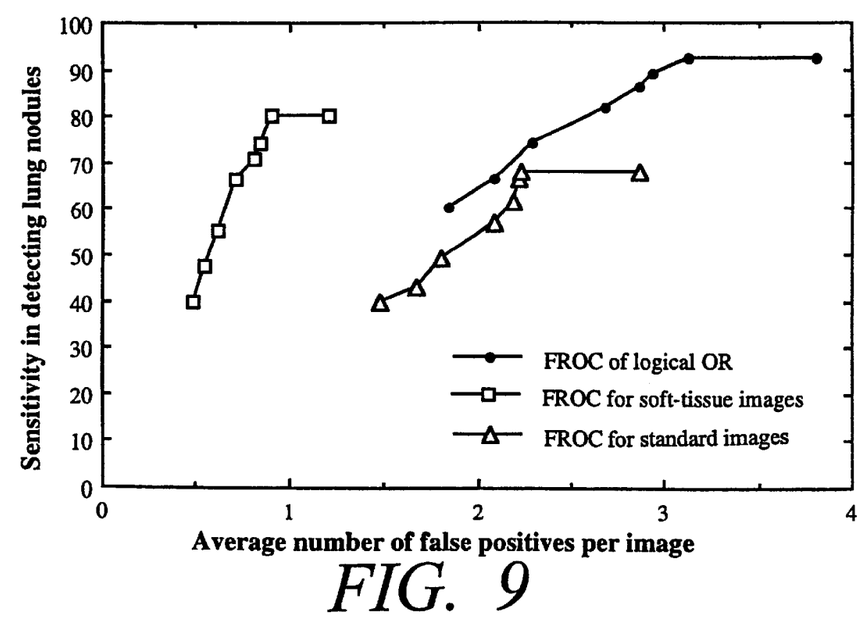
FIG. 9 is a graph comparing FROC curves resulting from the application of the CAD scheme according to the present invention on soft-tissue chest images, standard chest images, and the logical OR combination thereof, respectively.

FIG. 9 shows FROC curves for cases where the CAD scheme is applied to standard chest images, the corresponding soft-tissue images, and a logical OR combination of the detection results from both the standard and soft-tissue images. It is noted that the CAD scheme typically achieves better performance as applied to soft-tissue images, in terms of high sensitivity and low false positive rate, as compared to being applied to standard chest images. For this very limited database, at the sensitivity of 70%, the false positive rate is less than 1 per chest image for soft-tissue images. However, for standard chest images, the false positive rate is about 2.2 per chest image at the same sensitivity level. The logical OR combination can have a much higher sensitivity in the detection of lung nodules in chest images, as shown in FIG. 9. For a sensitivity above 90%, the number of false positives per chest image is about 3.2 for the logical OR combination. By comparing the FROC curves for the logical OR combination and the standard and soft-tissue chest images, it is apparent that an increase in the sensitivity from 70% to 90% is more significant than a modest increase in the number of false positives per image (from about 2.2 to 3.2). Since radiologists may miss up to 30% of actual lung cancer cases in reading chest images, the CAD scheme according to the present invention with a detection sensitivity of 90% and a modest false positive rate may greatly improve the radiologists' diagnostic accuracy in detecting lung nodules in chest images.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art.

The present invention includes a computer program product which is a storage medium including instructions which can be used to program a computer to perform processes of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Figure 10:
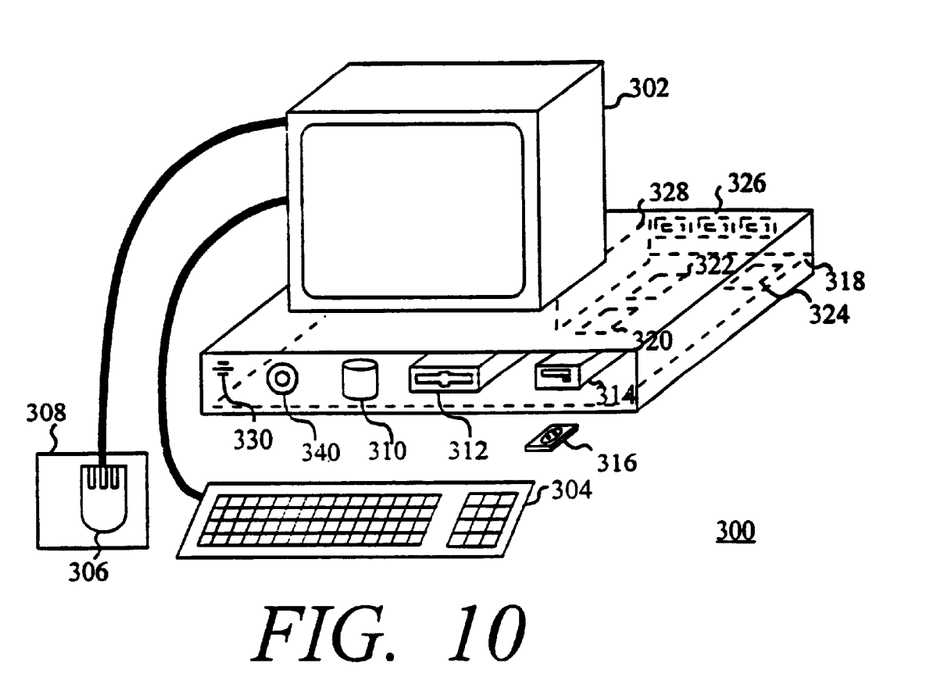
FIG. 10 is a schematic illustration of a general purpose computer 300 programmed according to the teachings of the present invention.

FIG. 10 is detailed schematic diagram of the general purpose computer 300 of FIG. 1. In FIG. 10, the computer 300, for example, includes a display device 302, such as a touch screen monitor with a touch-screen interface, a keyboard 304, a pointing device 306, a mouse pad or digitizing pad 308, a hard disk 310, or other fixed, high density media drives, connected using an appropriate device bus, such as a SCSI bus, an Enhanced IDE bus, a PCI bus, etc., a floppy drive 312, a tape or CD ROM drive 314 with tape or CD media 316, or other removable media devices, such as magneto-optical media, etc., and a mother board 318. The motherboard 318 includes, for example, a processor 320, a RAM 322, and a ROM 324, I/O ports 326 which are used to couple to the image acquisition device 200 of FIG. 1, and optional specialized hardware 328 for performing specialized hardware/software functions, such as sound processing, image processing, signal processing, neural network processing, etc., a microphone 330, and a speaker or speakers 340.

Stored on any one of the above described storage media (computer readable media), the present invention includes programming for controlling both the hardware of the computer 300 and for enabling the computer 300 to interact with a human user. Such programming may include, but is not limited to, software for implementation of device drivers, operating systems, and user applications. Such computer readable media further includes programming or software instructions to direct the general purpose computer 300 to perform tasks in accordance with the present invention.

The programming of general purpose computer 300 may include a software module for digitizing and storing images obtained from the image acquisition device 200 of FIG. 1. Alternatively, it should be understood that the present invention can also be implemented to process digital data derived from images obtained by other means.

The invention may also be implemented by the preparation of application specific integrated circuits or by interconnecting an appropriate network of conventional component circuits, as will be readily apparent to those skilled in the art.

Although the present invention is described in terms of adaptive rule-based analysis (FIG. 2, steps 40 and 40') occurring prior to ANN analysis (FIG. 2, steps 50 and 50'), it should be understood that the ANN analysis can precede the adaptive rule-based analysis. Also, while the preferred embodiment includes ANN analysis, improvement in lung nodule detection, relative to the prior schemes, can be achieved according to the present invention by OR' ing remaining candidate nodules after adaptive rule-based analysis. Thus, if processing simplicity is paramount, one or both of ANN steps 50,50' can be eliminated, albeit with a reduction in performance.

Obviously, numerous modifications and variations of the present invention are possible in light of the above teachings. It is therefore to be understood that within the scope of the appended claims, the invention may be practiced otherwise than as specifically described herein.

APPENDIX

REFERENCES:

[1] Cancer facts and figures—1996, Atlanta: American Cancer Society, 1996.

[2] L. H. Garland, "Studies on the accuracy of diagnostic procedures," AJR 82, 25–38 (1959).

[3] J. V. Forrest and P. J. Friedman, "Radiologic errors in patients with lung cancer," West J. Med. 134, 485–490 (1981).

[4] J. R. Muhm, W. E. Miller, R. S. Fontana, D. R. Sanderson, and M. A. Uhlenhopp, "Lung cancer detected during a screening program using four-month radiographs," Radiology 148, 609–615 (1983).

[5] X. W. Xu, K. Doi, T. Kobayashi, H. MacMahon, and M. L. Giger, "Development of an improved CAD scheme for automated detection of lung nodules in digital chest images," Med. Phys. 24, 1395–1403 (1997).

[6] X. W. Xu, H. MacMahon, M. L. Giger, and K. Doi, "Adaptive feature analysis of false positives for computerized detection of lung nodules in digital chest images," SPEE Medical Imaging 1997, 3034, 428–436 (1997).

[7] S. Kido, J. Ikezoe, H. Naito, J. Arisawa, S. Tamura, T. Kozuka, W. Ito, K. Shimura, H. Kato, "Clinical Evaluation of Pulmonary Nodules with Single-Exposure Dual-Energy Subtraction Chest Radiography with an Iterative Noise-Reduction Algorithm," Radiology, 194:407 (1995).

[8] S. Kido, J. Ikezoe, H. Naito, et al, "Single-Exposure Dual-Energy Chest Images with Computed Radiography: Evaluation with Simulated Pulmonary Nodules," Invest. Radiol., 28:482 (1993).

[9] D. L. Ergun, C. A. Mistretta, D. E. Brown, R. T. Bystrianyk, W. K. Sze, F. Kelcz, D. P. Naidich, "Single-Exposure Dual-Energy Computed Radiography: Improved Detection and Processing," Radiology, 174:243 (1990).

[10] T. Ishigaki, S. Sakuma, M. Ikeda, "One-Shot Dual-Energy Subtraction Chest Imaging with Computed Radiography: Clinical Evaluation of Film Images," Radiology, 168:67 (1988).

[11] R. G. Fraser, N. M. Hickey, L. T. Nikalson, E. A. Sabbagh, R. F. Luna, C. B. Alexander, C. A. Robinson, A-L. A. Katzenstein, G. T. Barnes, "Calcification in Pulmonary Nodules: Detection with Dual-Energy Digital Radiography," Radiology, 160:595 (1986).

What is claimed as new and desired to be secured by Letters Patent of the United States is:

1. A method for computerized detection of lung abnormalities, comprising:

obtaining first and second digital chest images, said first digital chest image comprising a standard digital chest image and said second digital chest image comprising a soft-tissue digital chest image derived from a chest x-ray image in which bony structures are removed by subtraction of a first weighted low energy x-ra exposed image from a second weighted high energy x-ray exposed image;

generating a first difference image from the standard digital chest image by a step of signal-to-noise ratio (SNR) suppressing filtering of said standard digital chest image to produce a SNR-suppressed standard image, and a step of SNR enhancing filtering of said standard digital chest image to produce a SNR-enhanced standard image, and a step of producing a difference image between said SNR-suppressed standard image and said SNR-enhanced standard image;

generating a second difference image from the soft-tissue digital chest image by a step of signal-to-noise ratio (SNR) suppressing filtering of said soft-tissue digital chest image to produce a SNR-suppressed soft-tissue digital chest image, and a step of SNR enhancing filtering of said soft-tissue digital chest image to produce a SNR-enhanced soft-tissue digital chest image, and a step of producing a difference image between said SNR-suppressed soft-tissue digital chest image and said SNR-enhanced soft-tissue digital chest image;

identifying candidate abnormalities in the first and second difference images;

extracting from the standard digital chest image and the first difference image predetermined first features of each of the candidate abnormalities identified in the first difference image;

extracting from the soft-tissue digital chest image and the second difference images predetermined second features of each of the candidate abnormalities identified in the second difference image;

analyzing the extracted first features and the extracted second features to identify and eliminate false positive candidate abnormalities respectively corresponding thereto;

performing a logical OR operation of the candidate abnormalities derived respectively from the first and second difference images and remaining after the elimination of the false positive candidate abnormalities; and outputting a signal indicative of a result of performing the logical OR operation.

2. The method of claim 1, wherein the step of outputting comprises:

displaying one of a standard chest image and a soft-tissue chest image corresponding to the respective standard digital chest image and soft-tissue digital chest image, and indicating thereon a location of the candidate abnormalities.

3. The method of claim 1, wherein the step of analyzing the candidate abnormalities comprises:

using adaptive rule-based analysis on plural of the extracted features.

4. The method of claim 1, wherein the step of analyzing the candidate abnormalities comprises:

using adaptive rule-based analysis specific to features extracted from the standard digital chest image and the first difference image to identify and eliminate false positive candidate abnormalities identified in said first difference image; and using adaptive rule-based analysis specific to features extracted from the soft-tissue digital chest image and the second difference image to identify and eliminate false positive candidate abnormalities identified in said second difference image.

5. The method of claim 1, wherein the step of analyzing the candidate abnormalities comprises performing at least one of the following steps:

applying, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and applying, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

6. The method of claim 3, wherein the step of analyzing the candidate abnormalities comprises performing at least one of the following steps:

applying, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and applying, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

7. The method of claim 4, wherein the step of analyzing the candidate abnormalities comprises performing at least one of the following steps:

applying, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and applying, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

8. A computer readable medium storing computer instructions for computerized detection of lung abnormalities in a standard digital chest image and a soft-tissue digital chest image derived from a chest x-ray image in which bony structures are removed by subtraction of a first weighted low energy x-ray exposed image from a second weighted high energy x-ray exposed image, by performing the steps of:

obtaining first and second digital chest images, said first digital chest image comprising a standard digital chest image and said second digital chest image comprising a soft-tissue digital chest image;

generating a first difference image from the standard digital chest image by a step of signal-to-noise ratio (SNR) suppressing filtering of said standard digital chest image to produce a SNR-suppressed standard image, and a step of SNR enhancing filtering of said standard digital chest image to produce a SNR-enhanced standard image, and a step of producing a difference image between said SNR-suppressed standard image and said SNR-enhanced standard image;

generating a second difference image from the soft-tissue digital chest image by a step of signal-to-noise ratio (SNR) suppressing filtering of said soft-tissue digital chest image to produce a SNR-suppressed soft-tissue digital chest image, and a step of SNR enhancing filtering of said soft-tissue digital chest image to produce a SNR-enhanced soft-tissue digital chest image, and a step of producing a difference image between said SNR-suppressed soft-tissue digital chest image and said SNR-enhanced soft-tissue digital chest image;

identifying candidate abnormalities in the first and second difference images;

extracting from the standard digital chest image and the first difference image predetermined first features of each of the candidate abnormalities identified in the first difference image;

extracting from the soft-tissue digital chest image and the second difference images predetermined second features of each of the candidate abnormalities identified in the second difference image;

analyzing the extracted first features and the extracted second features to identify and eliminate false positive candidate abnormalities respectively corresponding thereto;

performing a logical OR operation of the candidate abnormalities derived respectively from the first and second difference images and remaining after the elimination of the false positive candidate abnormalities; and outputting a signal indicative of a result of performing the logical OR operation.

9. The computer readable medium of claim 8, further storing computer instructions, for performing the step of outputting, comprising:

displaying one of a standard chest image and a soft-tissue chest image corresponding to the respective standard digital chest image and soft-tissue digital chest image, and indicating thereon a location of the candidate abnormalities derived from the logical OR operation.

10. The computer readable medium of claim 8, wherein the stored computer instructions for performing the step of analyzing comprise:

using adaptive rule-based analysis on plural of the extracted features.

11. The computer readable medium of claim 8, wherein the stored computer instructions for performing the step of analyzing comprise:

using adaptive rule-based analysis specific to features extracted from the standard digital chest image and the first difference image to identify and eliminate false positive candidate abnormalities identified in said first difference image; and using adaptive rule-based analysis specific to features extracted from the soft-tissue digital chest image and the second difference image to identify and eliminate false positive candidate abnormalities identified in said second difference image.

12. The computer readable medium of claim 8, wherein the stored computer instructions for performing the step of analyzing comprise instructions for performing at least one of the following steps:

applying, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and applying, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

13. The computer readable medium of claim 10, wherein the stored computer instructions for performing the step of analyzing comprise instructions for performing at least one of the following steps:

applying, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and applying, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

14. The computer readable medium of claim 11, wherein the stored computer instructions for performing the step of analyzing comprise instructions for performing at least one of the following steps:

applying, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and applying, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

15. A system for computerized detection of lung abnormalities, comprising:

a mechanism configured to obtain first and second digital chest images, said first digital chest image comprising a standard digital chest image and said second digital chest image comprising a soft-tissue digital chest image derived from a chest x-ray image in which bony structures are removed by subtraction of a first weighted low energy x-ray exposed image from a second weighted high energy x-ray exposed image;

a mechanism configured to generate a first difference image from the standard digital chest image by a step of signal-to-noise ratio (SNR) suppressing filtering of said standard digital chest image to produce a SNR-suppressed standard image, and a step of SNR enhancing filtering of said standard digital chest image to produce a SNR-enhanced standard image, and a step of producing a difference image between said SNR-suppressed standard image and said SNR-enhanced standard image;

a mechanism configured to generate a second difference image from the soft-tissue digital chest image by a step of signal-to-noise ratio (SNR) suppressing filtering of said soft-tissue digital chest image to produce a SNR-suppressed soft-tissue digital chest image, and a step of SNR enhancing filtering of said soft-tissue digital chest image to produce a SNR-enhanced soft-tissue digital chest image, and a step of producing a difference image between said SNR-suppressed soft-tissue digital chest image and said SNR-enhanced soft-tissue digital chest image;

a mechanism configured to identify candidate abnormalities in the first and second difference images;

a mechanism configured to extract from the standard digital chest image and the first difference image predetermined first features of each of the candidate abnormalities identified in the first difference image;

a mechanism configured to extract from the soft-tissue digital chest image and the second difference images predetermined second features of each of the candidate abnormalities identified in the second difference image;

a mechanism configured to analyze the extracted first features and the extracted second features to identify and eliminate false positive candidate abnormalities respectively corresponding thereto;

a mechanism configured to perform a logical OR operation of the candidate abnormalities derived respectively from the first and second difference images and remaining after the elimination of the false positive candidate abnormalities; and a mechanism configured to output a signal indicative of a result of performing the logical OR operation.

16. The system of claim 15, wherein the output mechanism is configured to display at least one of a standard image and a soft-tissue image and indicate thereon a location of at least one of:

the candidate abnormalities derived from the first difference image, remaining after the elimination of the false positive candidate abnormalities, the candidate abnormalities derived from the second difference image, remaining after the elimination of the false positive candidate abnormalities, and the candidate abnormalities derived from the logical OR operation.

17. The system of claim 15, wherein the analyzing mechanism is configured to analyze the candidate abnormalities using adaptive rule-based analysis on plural of the extracted features.

18. The system of claim 15, wherein the analyzing mechanism comprises:

a mechanism configured to analyze candidate abnormalities identified in said first difference image using adaptive rule-based analysis specific to features extracted from the standard digital chest image and the first difference image to identify and eliminate false positive candidate abnormalities identified in said first difference image; and a mechanism configured to analyze candidate abnormalities identified in said second difference image using adaptive rule-based analysis specific to features extracted from the soft-tissue digital chest image and the second difference image to identify and eliminate false positive candidate abnormalities identified in said second difference image.

19. The system of claim 15, wherein the analyzing mechanism comprises:

a mechanism configured to apply, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and a mechanism configured to apply, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

20. The system of claim 17, wherein the analyzing mechanism comprises:

a mechanism configured to apply, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and a mechanism configured to apply, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

21. The system of claim 18, wherein the analyzing mechanism comprises:

a mechanism configured to apply, for each candidate abnormality derived from the standard digital chest image and the first difference image, plural extracted features extracted from the respective candidate abnormality to a trained artificial neural network and eliminating false positive candidate abnormalities based on an output of the trained artificial neural network; and a mechanism configured to apply, for each candidate abnormality derived from the soft-tissue digital chest image and the second difference image, plural extracted features extracted from the respective candidate abnormality to a trained artificial neural network and eliminating false positive candidate abnormalities based on an output of the trained artificial neural network.

\* \* \* \* \*